US009669707B2

(12) United States Patent
Zhang

(10) Patent No.: US 9,669,707 B2
(45) Date of Patent: Jun. 6, 2017

(54) VERTICAL SHAFT FUEL TANK CAP WITH CHARCOAL CANISTER

(71) Applicant: CHONGQING FENGRUI PLASTIC Co., Ltd., Chongqing (CN)

(72) Inventor: Yi Zhang, Chongqing (CN)

(73) Assignee: CHONGQING FENGRUI PLASTIC CO., LTD., Chongqing (CN)

( * ) Notice: Subject to any disclaimer, the term of this patent is extended or adjusted under 35 U.S.C. 154(b) by 1 day.

(21) Appl. No.: 14/771,861

(22) PCT Filed: Mar. 30, 2015

(86) PCT No.: PCT/CN2015/075365
§ 371 (c)(1),
(2) Date: Sep. 1, 2015

(87) PCT Pub. No.: WO2016/127475
PCT Pub. Date: Aug. 18, 2016

(65) Prior Publication Data
US 2016/0361994 A1  Dec. 15, 2016

(30) Foreign Application Priority Data
Feb. 13, 2015  (CN) .......................... 2015 1 0080674

(51) Int. Cl.
*B60K 15/05*  (2006.01)
*B01D 53/04*  (2006.01)
(Continued)

(52) U.S. Cl.
CPC ...... *B60K 15/0406* (2013.01); *B01D 53/0423* (2013.01); *B60K 15/03504* (2013.01);
(Continued)

(58) Field of Classification Search
CPC ................ B01D 53/04; B01D 53/0423; B01D 2253/102; B01D 2257/708;
(Continued)

(56) References Cited

U.S. PATENT DOCUMENTS

2005/0121004 A1  6/2005  Yamada et al.
2008/0110889 A1  5/2008  Ohsawa et al.
(Continued)

FOREIGN PATENT DOCUMENTS

CN      101445050 U    6/2009
CN      202381203 U    8/2012
(Continued)

*Primary Examiner* — Frank Lawrence
(74) *Attorney, Agent, or Firm* — Andrew W. Chu; Craft Chu PLLC

(57) ABSTRACT

The vertical shaft fuel tank cap with a charcoal canister includes a fuel tank inner cap and a fuel tank outer cap. A hollow room or cavity with an upper opening is disposed in the center of the fuel tank inner cap. The fuel tank outer cap is above the fuel tank inner cap. The ventilating cap or vent cap is disposed in the cavity and divides the cavity into a filling cavity and a containing cavity. The air outlet leading the fuel vapor to the containing cavity is on the bottom of the containing room. The air passageway is between the outer walls of the vent cap and an inner wall of the containing cavity. The fuel-absorption substrate is disposed in the filling cavity. The filtering performance of charcoal powder can be enhanced since it is exempted from long-time fuel soaking.

10 Claims, 4 Drawing Sheets

(51) Int. Cl.
*B60K 15/04* (2006.01)
*B60K 15/035* (2006.01)

(52) U.S. Cl.
CPC ........ *B60K 15/05* (2013.01); *B01D 2253/102* (2013.01); *B01D 2257/708* (2013.01); *B01D 2259/4516* (2013.01)

(58) Field of Classification Search
CPC ........ B01D 2259/4516; B60K 15/0406; B60K 15/03504
USPC .............. 95/146; 96/134, 147; 123/518, 519
See application file for complete search history.

(56) References Cited

U.S. PATENT DOCUMENTS

| | | | | |
|---|---|---|---|---|
| 2009/0294450 | A1* | 12/2009 | Schmalz | B60K 15/0406 220/371 |
| 2011/0290118 | A1* | 12/2011 | Tanaka | B60K 15/04 96/139 |
| 2013/0001229 | A1* | 1/2013 | Wang | F02M 25/0854 220/373 |
| 2016/0243489 | A1* | 8/2016 | Yi | B65D 51/16 |

FOREIGN PATENT DOCUMENTS

| | | |
|---|---|---|
| CN | 104210357 A | 12/2014 |
| CN | 204136700 U | 2/2015 |
| CN | 204553018 U | 8/2015 |
| JP | 2010254189 A | 11/2010 |

\* cited by examiner

VERTICAL SHAFT FUEL TANK CAP WITH CHARCOAL CANISTER

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to a vertical shaft fuel tank cap with a charcoal canister.

2. Description of Related Art Including Information Disclosed Under 37 CFR 1.97 and 37 CFR 1.98

In the current market, most fuel tank caps contain a containing room or containing cavity filled by charcoal powder. When the inner pressure of the fuel tank is higher than the outer pressure, to achieve internal-external pressure balance, the fuel vapor in the fuel tank passes through and gets filtered by charcoal powder. Then, the filtered fuel vapor is discharged to the atmosphere to achieve the goals of emission control and less environment pollution. However, not all fuel vapor can be absorbed in this way. When the inner temperature is too high, or there is too much vibration within the fuel tank, some liquid fuel enters the containing cavity, soaks the charcoal powder for long time, and then undermines the filtering performance of the charcoal powder.

BRIEF SUMMARY OF THE INVENTION

The present invention solves the current technology problems by providing a vertical shaft fuel tank with a charcoal canister.

The invention includes a vertical shaft fuel tank cap with a charcoal canister. The cap includes a fuel tank inner cap and a fuel tank outer cap. The hollow room or hollow cavity with an upper opening is disposed in the center of the fuel inner cap. The fuel tank outer cap covering the upper opening of the hollow cavity is disposed above the fuel tank inner cap. The ventilating cap or vent cap is disposed in the hollow cavity and divides the hollow cavity into a filling room or filling cavity and a containing room or containing cavity. The filling cavity is disposed above the containing cavity. The air outlet or air passageway leading the fuel vapor to the containing cavity is disposed on the bottom of the containing cavity. The air passageway for leading fuel vapor from the containing cavity to the filling cavity is disposed between the outer walls of the vent cap and an inner wall of the containing cavity. The fuel-absorption substrate is disposed in the filling cavity.

The present invention has the advantage that the residuary fuel in the containing cavity and filling cavity, through funnel-shaped bottom of the containing cavity and a plurality of air passageways on the bottom of the containing cavity, is drained completely and quickly into the fuel tank under the negative pressure of the fuel tank, when the gasoline engine stops. The vertical shaft fuel tank cap has better charcoal powder filtering performance with less environment pollution.

DETAILED DESCRIPTION OF THE INVENTION

The following description of the embodiments of the present invention is intended to illustrate and not to limit this invention.

Figure 1:
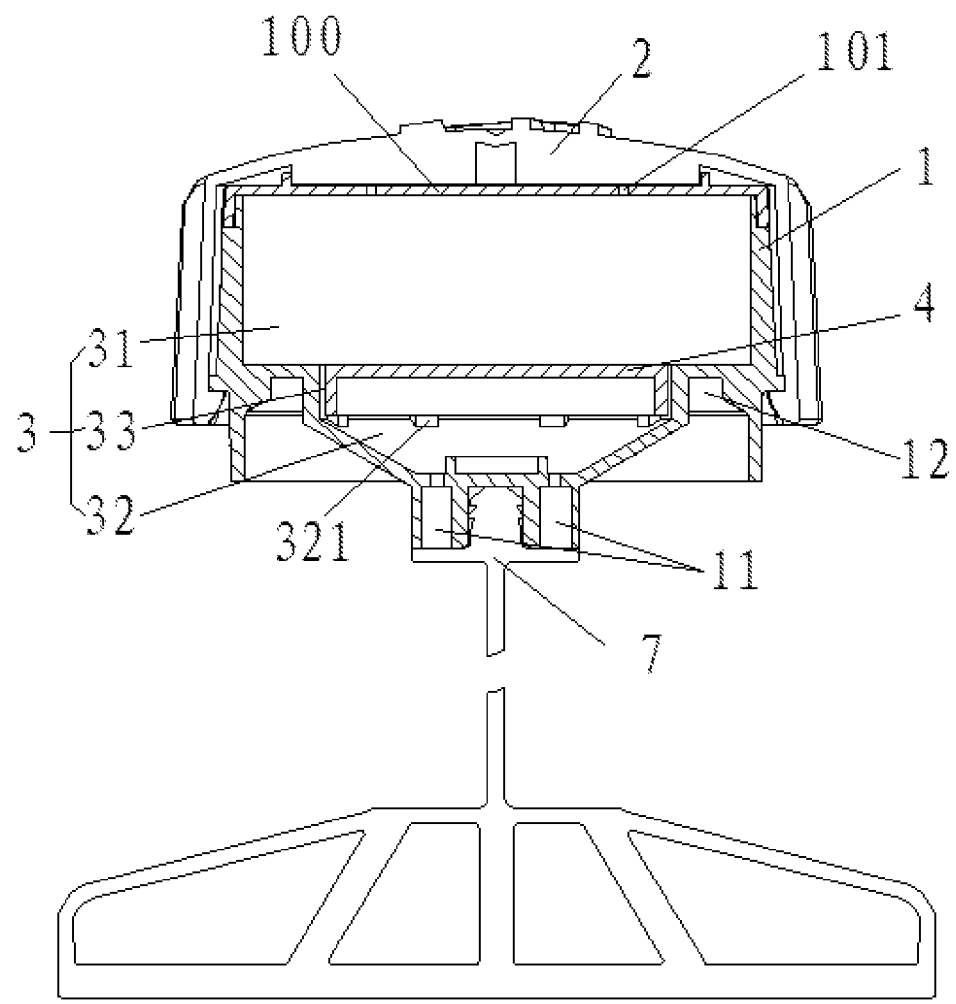
FIG. 1 is a structural schematic view of the present invention.
Figure 2:
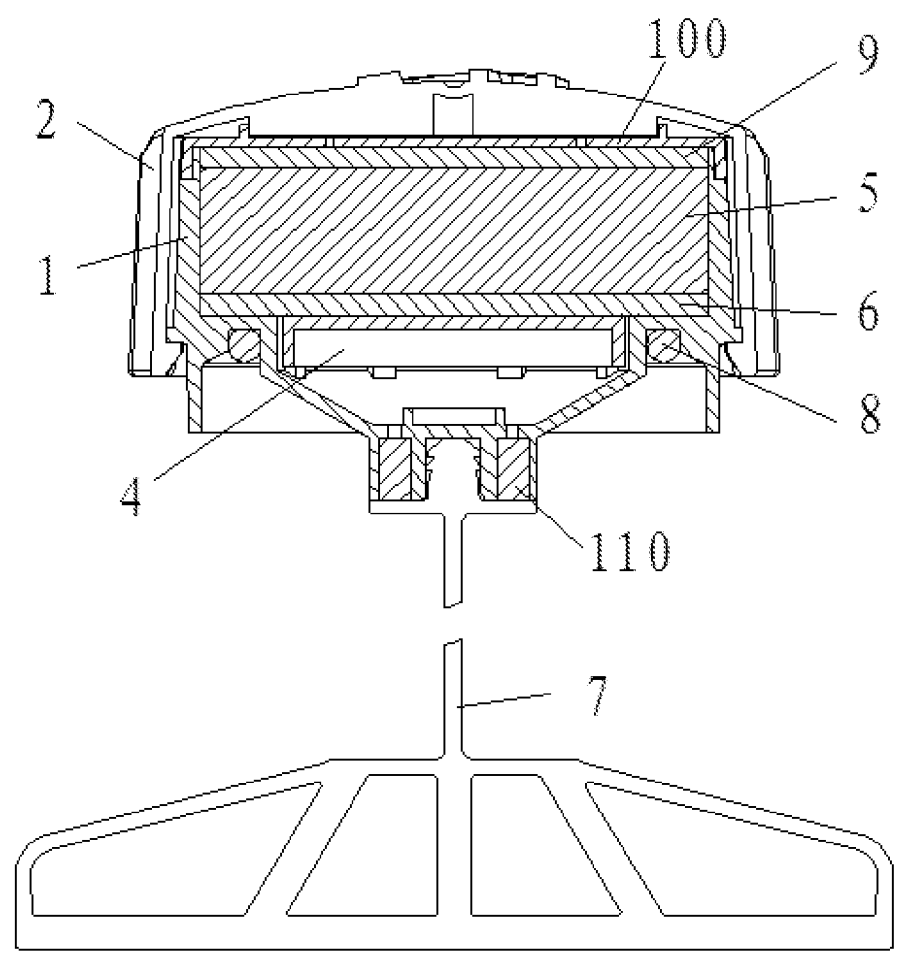
FIG. 2 is the structural schematic view of the present invention with fuel-absorption substrate.

FIG. 1 and FIG. 2 show the vertical shaft fuel tank cap with a charcoal canister, comprising a fuel tank inner cap 1, and the fuel tank outer cap 2. The hollow room or cavity 3 with an upper-opening is disposed in the center of fuel tank inner cap 1.

The fuel tank outer cap 2 covering the upper opening of hollow room or cavity 3 is disposed above and is non-hermetically connected with the fuel tank inner cap 1, thus the filtered fuel vapor can be discharged easily. The inner wall of the fuel tank outer cap 2 and the top of fuel tank inner cap 1 are in a clamping engagement.

The ventilating or vent cap 4 is disposed in the hollow room or cavity 3 and divides the hollow room or cavity 3 into the filling room or filling cavity 31 and containing room or containing cavity 32. The air interstice or passageway 33 leading fuel vapor from the containing room 32 to the filling room 31 is disposed between the outer walls of the vent cap 4 and an inner wall of the containing room or containing cavity 32.

Figure 3:
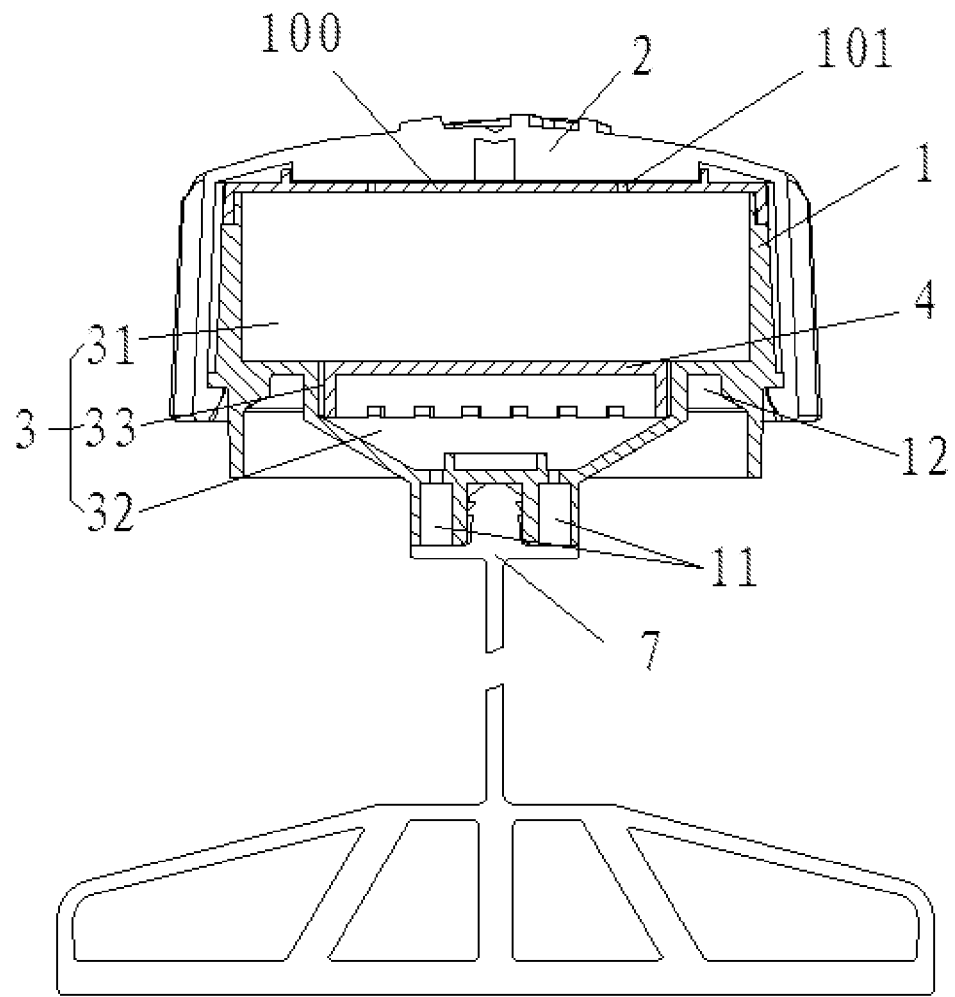
FIG. 3 is the structural schematic view of the bottom of the ventilating cap with a plurality of gaps.

In one embodiment, a plurality of protrusions 321 is disposed around the inner wall of the containing room or containing cavity 32. The contacting surface of the bottom of the ventilating or vent cap 4, engages the containing room or containing cavity 32, to prevent a tight connection between the bottom of the ventilating cap 4 and the inner wall of the containing room or containing cavity 32. Through the gaps composed by the plurality of protrusions 321 and the bottom of the ventilating cap 4, fuel vapor can enter the air interstice or passageway 33. FIG. 3 shows another embodiment to achieve same technical effect, wherein a plurality of gaps also can be disposed on bottom of the ventilating cap 4, thus simplifying the complexity of the containing room or cavity 32, and reducing production cost.

The fuel-absorption substrate 5 is disposed in the filling room or filling cavity 31. The fuel vapor is filtered by the fuel-absorption substrate 5 in the filling room or filling cavity 31, then discharged to the atmosphere, to achieve the goals of controlling emission and reducing pollution. In some embodiments, the fuel-absorption substrate 5 is activated charcoal.

The air outlet 11 is disposed on the bottom of the containing room or containing cavity 32. The air outlet 11 leads the vapored fuel to the containing room or containing cavity 32, and ensures that the residual fuel in the containing room or containing cavity 32 is drained completely and quickly into the fuel tank under the negative pressure of the fuel tank. There is better absorption function of the activated charcoal and less environmental pollution.

Embodiments show that the bottom of the containing room 32 can be funnel-shaped, ensuring that the residual fuel in the containing room or containing cavity 32 is drained completely and quickly into the fuel tank under the negative pressure of the fuel tank. There can be a better absorption function of the activated charcoal and less environmental pollution.

The first breathing board 6, with the fuel-absorption substrate 5 above, covering the air interstice 33 between the ventilating cap 4 and an inner wall of the containing room or containing cavity 32, is disposed above the bottom of the filling room or filling cavity 31. In this embodiment, the inner wall of the filling room or filling cavity 31 is cylindrical shaped, and the diameter of the ventilating cap 4 is less than that of the filling room 31, thus the first breathing board 6 can be easily disposed in the filling room or filling cavity 31. The first breathing board 6 of two-layer non-woven cloth functions to double filter the fuel vapor entering the filling room 31 from the containing room 32, and to prevent the charcoal powder from entering the filling room 31 to the fuel tank, which could block carburetor.

The embodiment also includes the second breathing board 9, covering the fuel-absorption substrate 5, which is preferred as two-layer non-woven cloth and disposed near the top of the filling room 31. The second breathing board 9 prevents leakage of the fuel-absorption substrate 5.

In some embodiments, there is a protrusion or reinforce rib disposed on the bottom of the fuel tank outer cap 2 to push the second breathing board 9 downwards.

The slot 12 with the O-ring 8 inside, is disposed on the bottom of the fuel tank inner cap 1, to connect with an actual fuel tank, thus reducing environmental pollution caused by the liquid fuel/fuel vapor non-filtered by the fuel-absorption substrate 5 in the filling room or filling cavity 3.

Figure 4:
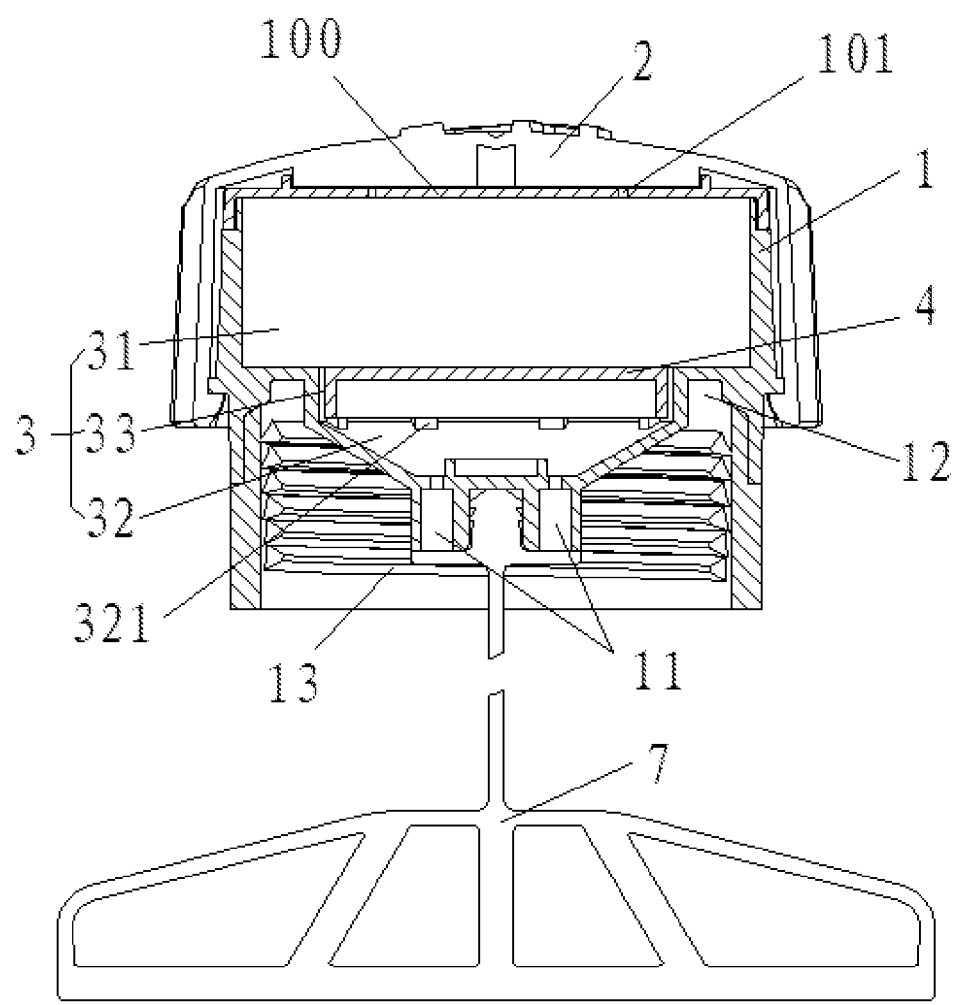
FIG. 4 is the structural schematic view of the bottom of the fuel inner cap with screw thread.

FIG. 4 shows an embodiment with a connecting screw thread 13 disposed on the bottom of the fuel tank inner cap 1 to connect with the fuel tank.

The separating board 100, covering the upper opening of the hollow room 3, is disposed between the fuel tank outer cap 2 and second breathing board 9. The separating board 100 pushes the second breathing board 9 downwards to prevent the leakage of fuel-absorption substrate 5.

The embodiment also includes the hook or hanger 7, disposed under the fuel tank inner cap 1 and in a clamping engagement with the bottom of the containing room 32. In this embodiment, the hook 7 is disposed on the bottom center of the containing room 32, and a plurality of air outlets 11 are disposed around and above the hook 7.

Furthermore, breathing foam 110 can be disposed within the air outlets 11. The supporting panel is disposed on the connecting point between hook 7 and containing room 32 to prevent the drop of the breathing foam 110. The entering of liquid fuel/fuel vapor to the filling room 3 through the air interstice 33 and first breathing board 6, is buffered by the breathing foam 110, which is more smooth. The residual fuel in the containing room 32 is drained completely and quickly into the fuel tank under the negative pressure of the fuel tank, for better absorption function of the activated charcoal.

The little liquid fuel and fuel vapor, arising from the fuel tank during the working process, following the flow of liquid fuel/fuel vapor, through the air outlet 11, containing room 32, the air interstice or passageway 33, and the first breathing board 6, enter the filling room 31, then gets filtered by the fuel-absorption substrate 5 and discharged to the atmosphere through the second breathing board 9 and the small pore 101 on the separating board 100.

Little liquid fuel enters the containing room 32 during the working process to protect the charcoal powder. At the meantime, when the gasoline engine stops, following the flow of liquid fuel/fuel vapor, the little residual fuel in the containing room 32 is drained completely and quickly into the fuel tank under the negative pressure of the fuel tank, for better absorption function of the activated charcoal, and less environment pollution.

When positive pressure or negative pressure occurs in the fuel tank, the experimental data about the flow of the liquid fuel entering into the containing room 32 and little liquid fuel drained from the containing room 32 to the fuel tank in every minute is as follows:

| | Positive/Negative Pressure Unit: Kpa, Flow Unit: L/Min | | | | | | | | | |
|---|---|---|---|---|---|---|---|---|---|---|
| Positive Pressure | 1.0 | 2.0 | 3.0 | 4.0 | 5.0 | 6.0 | 7.0 | 8.0 | 9.0 | 10.0 |
| Flow | 0 | 1.23 | 2.29 | 3.00 | 3.54 | 4.10 | 4.48 | 4.85 | 5.24 | 5.67 |
| Negative Pressure | −2.0 | −2.5 | −3.0 | −3.5 | −4.0 | −4.5 | −5.0 | −5.5 | −6.0 | −6.5 |
| Flow | 1.78 | 2.13 | 2.47 | 2.63 | 2.86 | 3.04 | 3.24 | 3.38 | 3.55 | 3.74 |

The above-described preferred embodiment of the present invention is not intended to limit the present invention, any modification within the spirit and principles of the present invention, made by the equivalent replacement, improvement, etc., should be included in the protection of the present invention within the range.

I claim:

1. A vertical shaft fuel tank cap with a charcoal canister, comprising:
   a fuel tank inner cap;
   a fuel tank outer cap,
   wherein a hollow cavity with an upper opening is disposed in a center of said fuel tank inner cap, said fuel tank outer cap covering said upper opening and being disposed above said fuel tank inner cap;
   a vent cap disposed in said hollow cavity and dividing said hollow cavity into a filling cavity and a containing cavity, said filling cavity being disposed above said containing cavity, said containing cavity having an air outlet in fluid connection with said containing room on a bottom of said containing room; and
   an air passageway connecting said containing cavity to said filling cavity and being disposed between outer walls of said vent cap and an inner wall of said containing cavity, said filling cavity containing a fuel-absorption substrate.

2. The vertical shaft fuel tank cap with a charcoal canister, according to claim 1, further comprising:

a first breathing board covering said air passageway and being disposed above a bottom of said filling cavity, said fuel absorption substrate being above said first breathing board.

3. The vertical shaft fuel tank cap with a charcoal canister, according to claim 1, further comprising:

a second breathing board covering said fuel-absorption substrate and being disposed above an upper outlet of said filling cavity.

4. The vertical shaft fuel tank with a charcoal canister, according to claim 3, further comprising:

a separating board, covering said upper opening of said hollow cavity and being disposed between said fuel tank outer cap and said second breathing board.

5. The vertical shaft fuel tank with a charcoal canister, according to claim 1, further comprising:

a plurality of protrusions being disposed around said inner wall of said containing cavity and contacting a surface of said bottom of said vent cap and said containing cavity.

6. The vertical shaft fuel tank with a charcoal canister, according to claim 1, further comprising:

a plurality of gaps, being disposed on a bottom of said ventilating cap.

7. The vertical shaft fuel tank with a charcoal canister, according to claim 1, wherein said bottom of said containing room is funnel-shaped.

8. The vertical shaft fuel tank with a charcoal canister, according to claim 1, further comprising:

a slot;

an O-ring inside said slot; and a screw thread disposed on a bottom of said fuel tank inner cap so as to connect to a fuel tank.

9. The vertical shaft fuel tank with a charcoal canister, according to claim 1, further comprising:

a hanger being disposed under said fuel tank inner cap.

10. The vertical shaft fuel tank with a charcoal canister, according to claim 9, further comprising:

a breathing foam disposed within said air outlet; and a supporting panel disposed on a connecting point between said hanger and said bottom of said containing cavity so as to prevent drop of said breathing foam.

\* \* \* \* \*